(12) United States Patent
Hsiao et al.

(10) Patent No.: US 11,149,205 B2
(45) Date of Patent: Oct. 19, 2021

(54) TRIPHASE ORGANIC MATTER PYROLYSIS SYSTEM AND ITS ATMOSPHERIC PRESSURE WATER ION GENERATING DEVICE

(71) Applicant: YAU FU INDUSTRY CO., LTD., New Taipei (TW)

(72) Inventors: Ruei-Chang Hsiao, New Taipei (TW); Guo-Zhong Zhang, New Taipei (TW); Yung-Chih Liu, New Taipei (TW)

(73) Assignee: Yau Fu Industry Co., Ltd, New Taipei (TW)

( * ) Notice: Subject to any disclaimer, the term of this patent is extended or adjusted under 35 U.S.C. 154(b) by 52 days.

(21) Appl. No.: 16/659,810

(22) Filed: Oct. 22, 2019

(65) Prior Publication Data

US 2020/0140761 A1    May 7, 2020

(30) Foreign Application Priority Data

Nov. 2, 2018  (TW) ................................. 107214943
Sep. 2, 2019  (TW) ................................. 108131542

(51) Int. Cl.
*C10B 49/02* (2006.01)
*C10B 57/02* (2006.01)
(Continued)

(52) U.S. Cl.
CPC .............. *C10B 49/02* (2013.01); *C10B 57/02* (2013.01); *C10B 57/08* (2013.01); *F22B 1/16* (2013.01); *F22G 1/005* (2013.01); *F22G 3/009* (2013.01)

(58) Field of Classification Search
CPC .......................... C10B 49/02; C10B 49/00–22
See application file for complete search history.

(56) References Cited

U.S. PATENT DOCUMENTS 4,097,360 A * 6/1978 Sack ...................... C10B 49/08
                                                                  201/12
4,632,731 A * 12/1986 Bodle ...................... C10F 5/00
                                                                  201/14
(Continued)

FOREIGN PATENT DOCUMENTS

JP          2000065312 A * 3/2000 ............. F22G 1/165

OTHER PUBLICATIONS

Machine Translation of JP2000065312A (May 5, 2021) (Year: 2021).*

*Primary Examiner* — Matthew J Merkling
(74) *Attorney, Agent, or Firm* — Bradley J. Thorson; DeWitt LLP

(57) ABSTRACT

A triphase organic matter pyrolysis system includes multiple devices cooperating with each other. The feeding device delivers organic matters into the preheating device. The preheated organic matters are delivered into the pyrolysis and carbonization reaction device. The steam generating device produces a saturated steam which is delivered into the water ion generating device which heats the saturated steam into a superheated steam which is dissociated into water ions which are delivered into the pyrolysis and carbonization reaction device. The water ions cut, dissociates and carbonizes the organic matters to form carbon residues and gas-liquid wastes. The heat energy is recycled by the heat recycle device and is delivered into the preheating device. The gas-liquid wastes are processed by the gas-liquid separation device and the gas purifying device to form gas and liquid that are harmless.

2 Claims, 9 Drawing Sheets

(51) Int. Cl.
*F22G 3/00* (2006.01)
*F22G 1/00* (2006.01)
*F22B 1/16* (2006.01)
*C10B 57/08* (2006.01)

(56) References Cited

U.S. PATENT DOCUMENTS

2003/0233788 A1* 12/2003 Lewis .................. C10J 3/00
　　　　　　　　　　　　　　　　　　　　　48/197 A
2018/0171250 A1* 6/2018 Chapman ............... C01B 3/047

* cited by examiner

TRIPHASE ORGANIC MATTER PYROLYSIS SYSTEM AND ITS ATMOSPHERIC PRESSURE WATER ION GENERATING DEVICE

BACKGROUND OF THE INVENTION

1. Field of the Invention

The present invention relates to a triphase organic matter (or material or substance or compound) pyrolysis (or decomposition) system and its atmospheric (or normal) pressure water ion generating device.

2. Description of the Related Art

In general, the industrial wastes are produced by the industry. The industrial wastes have different classes according to the industry of different types. The industrial wastes include solid, liquid and gas wastes, and cannot be disposed of freely. Thus, it is necessary to treat and process the industrial wastes efficiently, to prevent the industrial wastes from causing an environmental pollution, to prevent the industrial wastes from hurting the human body. A conventional waste treatment plant is only available for processing the industrial wastes of a single phase. For example, the solid wastes are treated by furnace incineration or sanitary burial, the liquid wastes are treated by sewage water purification or biological bacteria treatment, and the gaseous wastes are treated by secondary combustion of exhaust gas or by catalyst absorption to remove the pollutants. However, the industrial wastes usually contain solid, liquid and gas wastes which are mixed, such that the conventional waste treatment device cannot be used to solid, liquid and gas wastes simultaneously.

BRIEF SUMMARY OF THE INVENTION

In accordance with the present invention, there is provided a triphase organic matter pyrolysis system comprising a feeding device delivering organic matters; a preheating device connected with the feeding device to receive and preheat the organic matters; a steam generating device providing a saturated steam; a water ion generating device connected with the steam generating device, and receiving and heating the saturated steam into a superheated steam which is dissociated and transferred into water ions; a pyrolysis and carbonization reaction device connected with the preheating device and the water ion generating device, to receive the preheated organic matters of the preheating device and the water ions of the water ion generating device, the pyrolysis and carbonization reaction device treating the water ions and the organic matters under an atmospheric pressure and an anaerobic state by reactions of molecular scission, pyrolysis and carbonization, to form carbon residues and gas-liquid wastes; a heat recycle device connected with the preheating device and the pyrolysis and carbonization reaction device, to recycle and transmit a heat energy produced during operation of the pyrolysis and carbonization reaction device and a residual heat energy of the gas-liquid wastes to the preheating device; a gas-liquid separation device connected with the heat recycle device and the pyrolysis and carbonization reaction device, to receive waste water and waste gases that are separated from the gas-liquid wastes; and a gas purifying device connected with the gas-liquid separation device, and decomposing the waste gases into a harmless gas which is drained outward.

The feeding device delivers the organic matters into the preheating device to perform a preheating process. The preheated organic matters of the preheating device are delivered into the pyrolysis and carbonization reaction device. Water is filled into the steam generating device which heats the water to produce a saturated steam. The saturated steam of the steam generating device is delivered into the water ion generating device which heats the saturated steam to produce a superheated steam which is dissociated and transferred into water ions. The water ions of the water ion generating device are delivered into the pyrolysis and carbonization reaction device. An interior of the pyrolysis and carbonization reaction device is under an atmospheric pressure and is disposed at an anaerobic state. The water ions cut, dissociates and carbonizes the organic matters in the pyrolysis and carbonization reaction device to form the carbon residues and the gas-liquid wastes. The heat energy is recycled by the heat recycle device and is delivered into the preheating device. The gas-liquid wastes are processed by the gas-liquid separation device and the gas purifying device to form gas and liquid that are harmless.

In accordance with the present invention, there is also provided a water ion generating device arranged in a triphase organic matter pyrolysis system comprising a steam generating device and a pyrolysis and carbonization reaction device, the water ion generating device comprising a connecting pipe connected with the steam generating device, and having an interior that is penetrated; a heating tube having a first end connected with the connecting pipe and having an interior provided with an air channel, the air channel having a surface provided with an alloy catalyst layer; and a spraying head connected with a second end of the heating tube, and having an interior that is tapered, the spraying head being provided with a nozzle which is connected with the pyrolysis and carbonization reaction device.

The steam generating device produces a saturated steam which is delivered through the connecting pipe into the heating tube which heats the saturated steam to produce a superheated steam. The superheated steam is dissociated and transferred into water ions by the alloy catalyst layer of the air channel. The water ions of the water ion generating device enters the pyrolysis and carbonization reaction device under an atmospheric pressure and an approximately anaerobic state. The water ions cut, dissociates and carbonizes the organic matters in the pyrolysis and carbonization reaction device to form carbon residues.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
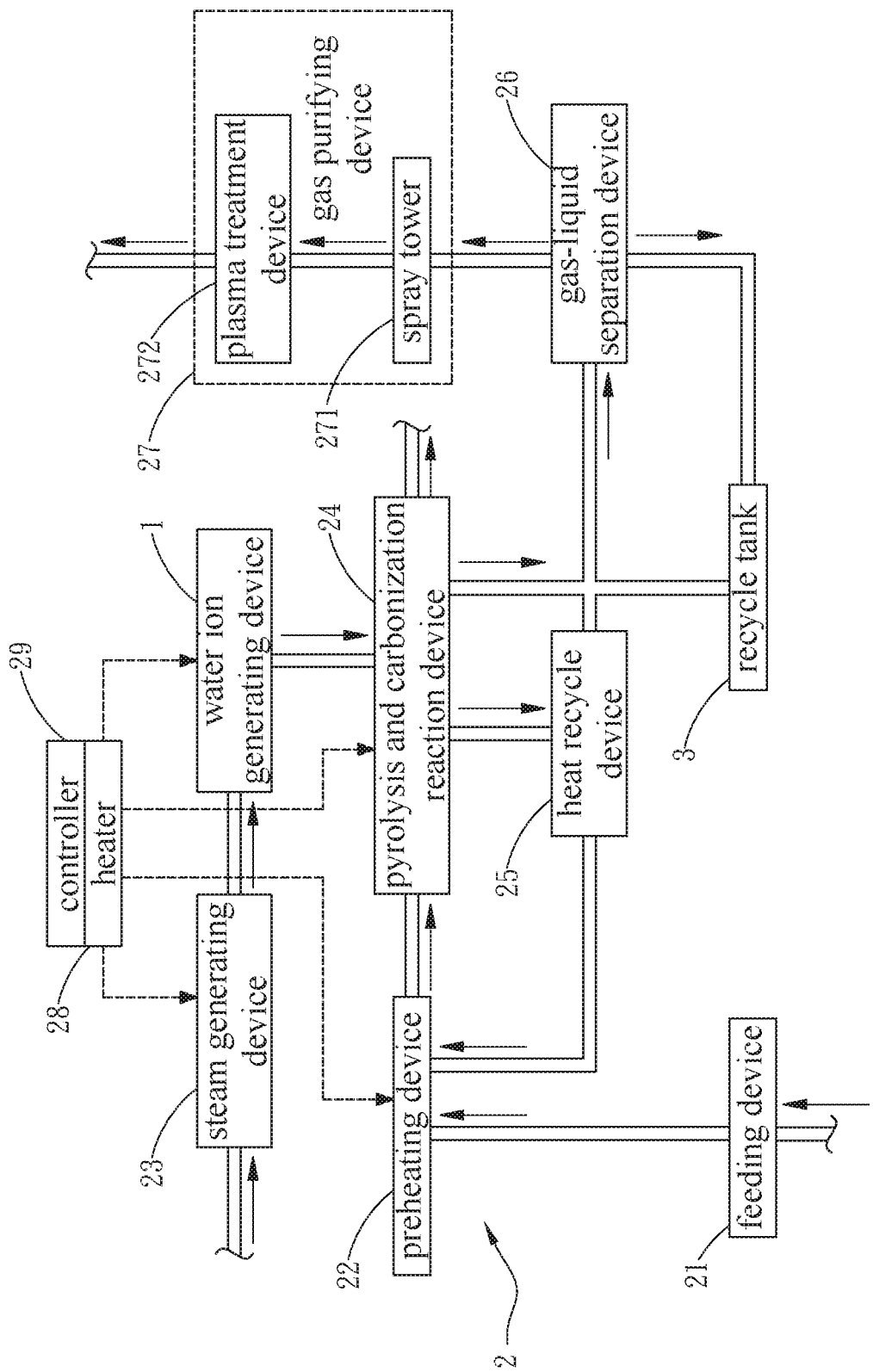
FIG. 1 is a block diagram of a triphase organic matter pyrolysis system in accordance with the preferred embodiment of the present invention.

Referring to the drawings and initially to FIG. 1, a triphase organic matter pyrolysis system 2 in accordance with the present invention comprises a feeding device 21, a preheating device 22, a steam (or vapor) generating device 23, a water ion generating device 1, a pyrolysis and carbonization reaction device 24, a heat recycle device 25, a gas-liquid separation (dissociation) device 26, a gas purifying device 27, a heater 28, and a controller 29.

The feeding device 21 delivers organic matters or compounds. Preferably, the organic matters include organic wastes of solid, liquid or gas phase that cannot be decomposed naturally and contain harmful substances, for example, sludge, sewage and waste gases. The feeding device 21 is used to deliver the sludge, sewage and waste gases that are to be processed.

The preheating device 22 is connected with the feeding device 21 to receive and preheat the organic matters of different classes. The preheating device 22 heats and evaporates the water in the organic matters previously or fills water into the organic matters that are too dry.

The steam generating device 23 fills and heats water to produce a saturated steam (or vapor) with a temperature of at least 130° C. to 160° C.

The water ion generating device 1 is connected with the steam generating device 23. The water ion generating device 1 receives and heats the saturated steam into a superheated steam which is dissociated and transferred into water ions.

The pyrolysis and carbonization reaction device 24 is connected with the preheating device 22 and the water ion generating device 1, to receive the preheated organic matters of the preheating device 22 and the water ions of the water ion generating device 1. The pyrolysis and carbonization reaction device 24 treats the water ions and the organic matters under an atmospheric (or normal) pressure and an anaerobic (or oxygen free) state by reactions of molecular scission, pyrolysis and carbonization, to form carbon residues (or dregs) and gas-liquid wastes.

The heat recycle device 25 is connected with the preheating device 22 and the pyrolysis and carbonization reaction device 24, to recycle and transmit a heat energy produced during operation of the pyrolysis and carbonization reaction device 24 and a residual heat energy of the gas-liquid wastes to the preheating device 22, so as to reduce an energy consumption of the triphase organic matter pyrolysis system 2. In the preferred embodiment of the present invention, the heat energy includes hot water or vapor at a high temperature.

The gas-liquid separation device 26 is connected with the heat recycle device 25 and the pyrolysis and carbonization reaction device 24, to receive waste water and waste gases that are separated from the gas-liquid wastes.

The gas purifying device 27 is connected with the gas-liquid separation device 26, and includes a spray tower 271 and a plasma treatment device 272.

The spray tower 271 is connected with the gas-liquid separation device 26, to receive and process the waste gases by a primary treatment, so as to eliminate acid/alkali, heavy metal, chlorine and carbon.

The plasma treatment device 272 is connected with the spray tower 271, to receive and process the waste gases after the primary treatment. The plasma treatment device 272 applies a high voltage (at least 20,000 to 30,000 volts) to decompose the waste gases, and to produce an electronic flashover which causes combustion, such that the waste gases are shocked electrically and decomposed by the plasma, and are burned in the space due to combustion caused by the electronic flashover. At this time, the plasma produces an $O_3$ reaction under high pressure and high temperature, such that the waste gases which cannot be burned are oxidated and decomposed by using $O_3$. Finally, the waste gases are drained outward when the waste gases cannot cause combustion any more.

The heater 28 is connected with the preheating device 22, the steam generating device 23, the water ion generating device 1, and the pyrolysis and carbonization reaction device 24 respectively. In the preferred embodiment of the present invention, the heater 28 is an electromagnetically heating device, wherein the interior of the pyrolysis and carbonization reaction device 24 will not produce flame during operation, such that the pyrolysis and carbonization reaction device 24 has an operational state with no open fires. In the electromagnetically heating device, the coil produces a magnetic field, with many eddy currents produced between the magnetic field and the metallic pipes or containers, such that the metallic pipes or containers produce the heat energy. The electromagnetically heating device is a traditional technology and will not be further described in details.

The controller 29 is connected with the heater 28, to control heating parameters of the preheating device 22, the steam generating device 23, the water ion generating device 1, and the pyrolysis and carbonization reaction device 24 respectively. Thus, the controller 29 preset working conditions (such as the heating time, the heating temperature or the like) of the heater 28 corresponding to the steam generating device 23, the water ion generating device 1, and the pyrolysis and carbonization reaction device 24 respectively. In addition, the controller 29 also monitors operations between the steam generating device 23, the water ion generating device 1, and the pyrolysis and carbonization reaction device 24, such as the circulation state and heat recycle state of the saturated steam and the superheated steam, the operation state of the pyrolysis and carbonization reaction device 24 or the like. It is appreciated that, the controller 29 may be a computer, a terminal, a server, a built-in system or the like.

In the triphase organic matter pyrolysis system 2 of the present invention, the superheated steam is divided or dissociated into water ions, including hydrogen ion ($H^+$) and hydroxyl ion or hydroxide ion ($OH^-$). Then, the organic matters are processed by molecular scission. Then, the organic matters are processed by carbonization to form carbon residues.

In practice, the feeding device 21 delivers the organic matters into the preheating device 22 to perform a preheating process. At this time, the water in the organic matters is increased or decreased. Then, the preheated organic matters of the preheating device 22 are delivered into the pyrolysis and carbonization reaction device 24. At the same time, water is filled into the steam generating device 23 which heats the water to produce a saturated steam of at least 130° C. to 160° C. The saturated steam of the steam generating device 23 is delivered into the water ion generating device 1 which receives and heats the saturated steam to produce a superheated steam which is dissociated and transferred into water ions. The water ions of the water ion generating device 1 are delivered into the pyrolysis and carbonization reaction device 24. Thus, the pyrolysis and carbonization reaction device 24 contains the preheated organic matters of the preheating device 22 and the water ions of the water ion generating device 1. The water ions and the organic matters are processed by reactions of ion exchange and molecular scission in the pyrolysis and carbonization reaction device 24. Thus, the water ions cut, dissociates and carbonizes the organic matters in the pyrolysis and carbonization reaction device 24 to form the carbon residues and the gas-liquid wastes. At this time, the interior of the pyrolysis and carbonization reaction device 24 will not produce flame during the pyrolysis process, such that the pyrolysis and carbonization reaction device 24 is disposed at an operational state with no open fires. In addition, the interior of the pyrolysis and carbonization reaction device 24 is under an atmospheric pressure and is disposed at a low oxygen content or an anaerobic state during the pyrolysis process.

The air in the pyrolysis and carbonization reaction device 24 and the hydrogen ion ($H^+$) in the water ions produce organic waste water after the reactions of ion exchange and molecular scission. The organic waste water is then directly drained into a recycle tank 3. The heat recycle device 25 receives and absorbs the heat energy of the high temperature vapor and the decomposed waste gas of the pyrolysis and carbonization reaction device 24. The heat energy recycled by the heat recycle device 25 is delivered into the preheating device 22 for drying and heating purposes. The residual low temperature waste gas processed by the heat recycle device 25 is delivered into and processed by the gas-liquid separation device 26. The gas-liquid separation device 26 drains the condensed waste water into a recycle tank 3. The waste gas that is not dissolved in the water after the pyrolysis process is delivered into the spray tower 271. A flocculant is added into the spray tower 271 to process the waste gas (that is not dissolved in the water) by a primary treatment, so as to eliminate acid/alkali (by acid-base neutralization), sulfide, heavy metal, chlorine and carbon. The waste gases (such as alkane, lipid, ester, carbon oxide or the like) that cannot be treated by the spray tower 271 are delivered into and burned by the plasma treatment device 272, and are then drained outward from the plasma treatment device 272. Thus, the gas-liquid wastes are processed by the gas-liquid separation device 26 and the gas purifying device 27 to form gas and liquid that are harmless.

Figure 2:
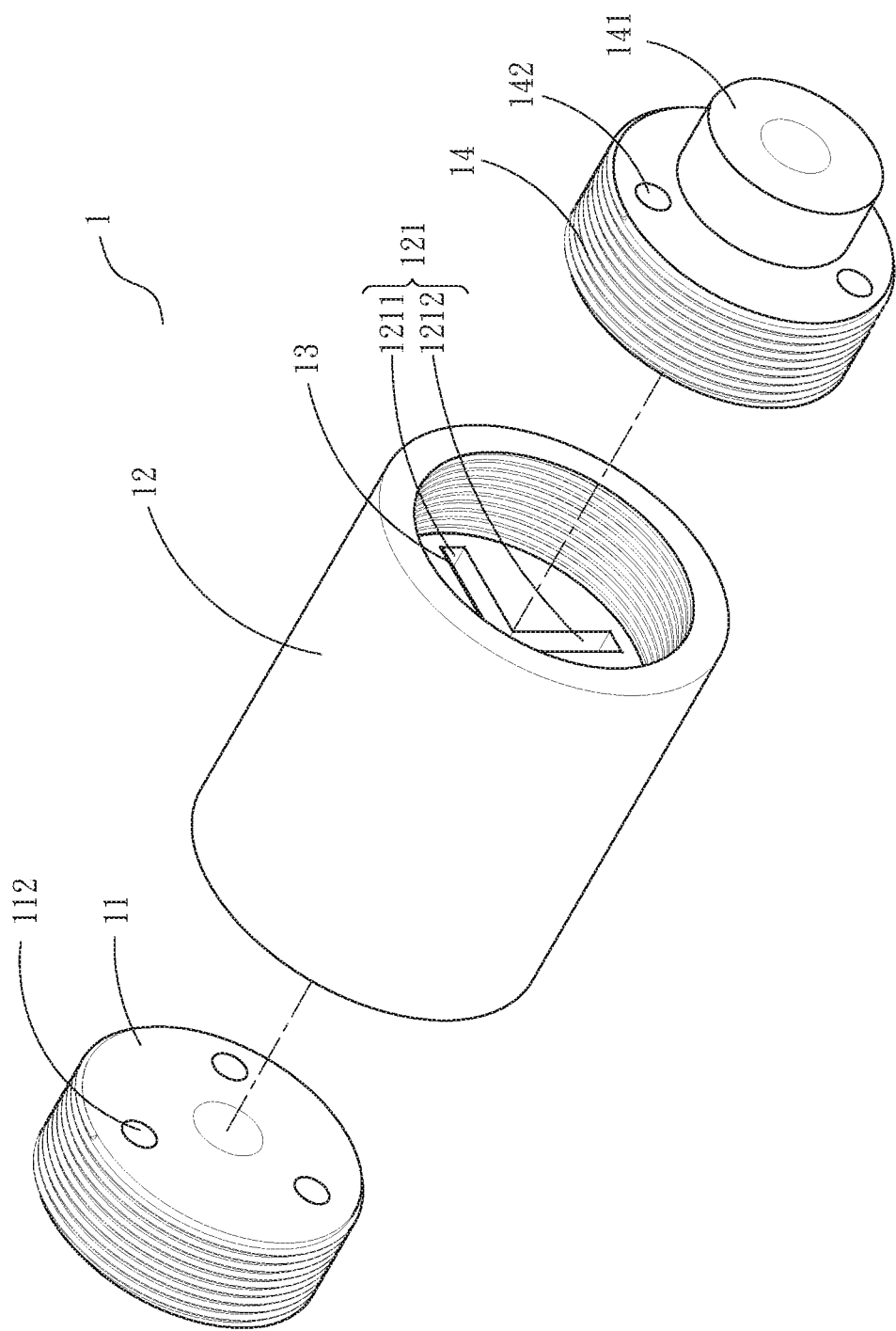
FIG. 2 is an exploded perspective view of a water ion generating device in accordance with the preferred embodiment of the present invention.
Figure 3:
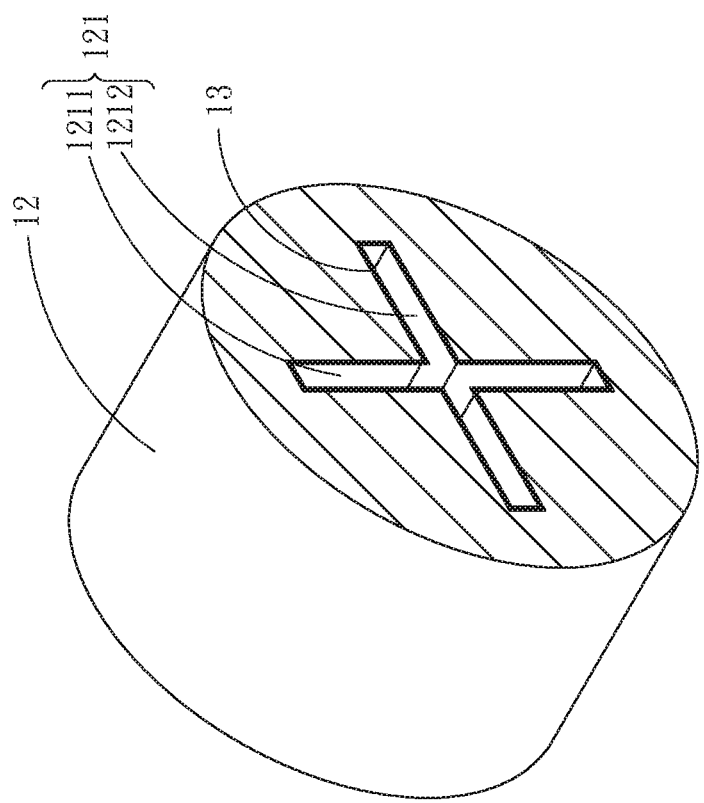
FIG. 3 is a locally enlarged cross-sectional view of a heating tube of the water ion generating device as shown in FIG. 2.
Figure 4:
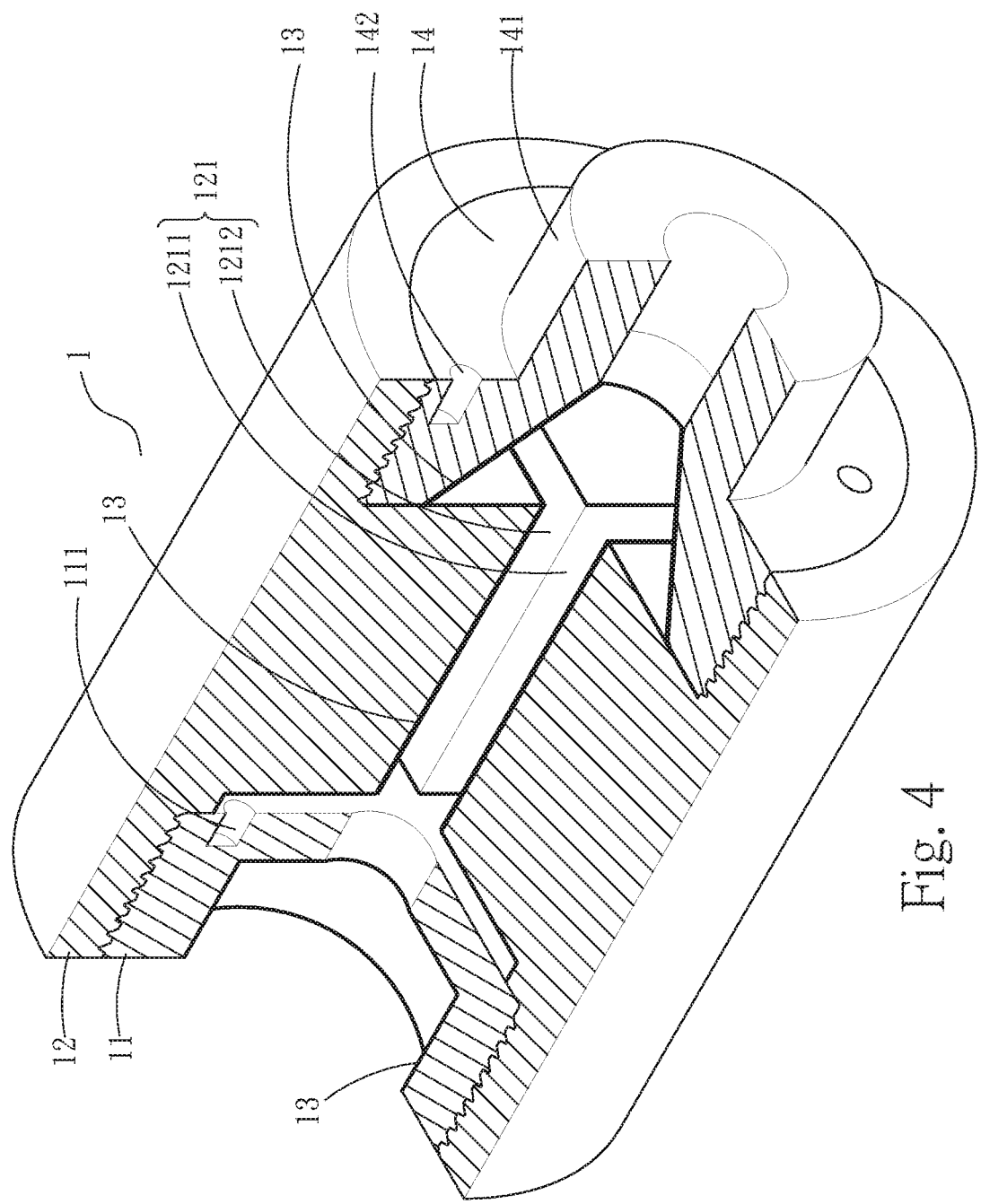
FIG. 4 is a perspective cross-sectional view of the water ion generating device in accordance with the preferred embodiment of the present invention.

Referring to FIGS. 2-4 with reference to FIG. 1, the water ion generating device 1 of the triphase organic matter pyrolysis system 2 in accordance with the present invention comprises a connecting pipe 11, a heating tube 12, and a spraying head 14.

The connecting pipe 11 is connected with the steam generating device 23 which produces and delivers a saturated steam into the connecting pipe 11. The connecting pipe 11 has an interior that is penetrated (or perforated), and has a surface provided with a plurality of first holes 112 to enhance the surface area and to provide a temperature (or heat) storage effect.

The heating tube 12 has a first end connected with the connecting pipe 11 and has an interior provided with an air channel 121 which has a surface provided with an alloy catalyst layer 13. The heating tube 12 heats the saturated steam into a superheated steam with a temperature of at least 600° C. The superheated steam is dissociated and transferred into water ions by the alloy catalyst layer 13 of the air channel 121. The air channel 121 has a diameter (or volume) smaller than that of the heating tube 12.

Figure 8:
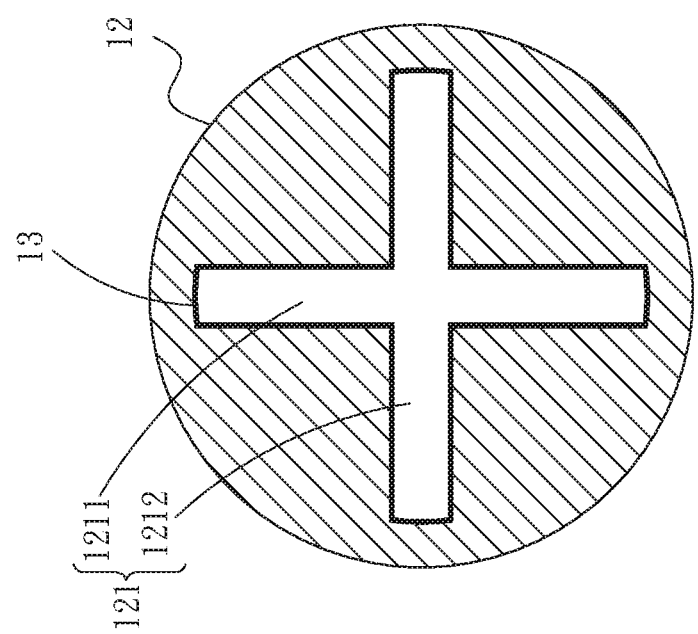
FIG. 8 is a cross-sectional view of the heating tube of the water ion generating device as shown in FIG. 3.

As shown in FIG. 8, the air channel 121 includes a first passage 1211 and a second passage 1212. The first passage 1211 and the second passage 1212 intersect and partially connect to construct a cruciform or X-shaped structure. Thus, the air channel 121 enhances the contact area of the alloy catalyst layer 13 and the superheated steam.

Figure 9:
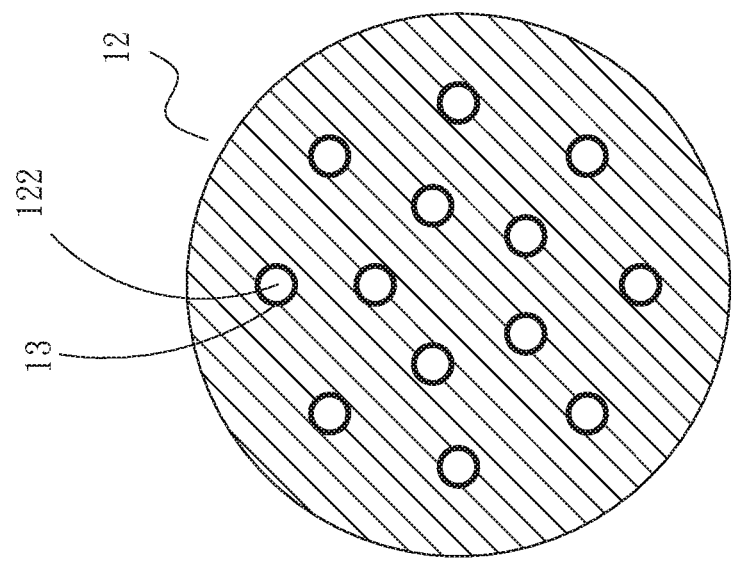
FIG. 9 is a cross-sectional view of a heating tube of the water ion generating device in accordance with another preferred embodiment of the present invention.

As shown in FIG. 9, the air channel 121 includes a plurality of third passages 123. Thus, the air channel 121 enhances the contact area of the alloy catalyst layer 13 and the superheated steam.

The alloy catalyst layer 13 is formed on the surface of the air channel 121 of the heating tube 12 by electroplating, chemical plating, sputtering, deposition, coating, immersion plating or hot dip galvanizing. The alloy of the alloy catalyst layer 13 includes tungsten-iron alloy, tungsten-copper alloy, tungsten-nickel alloy, tungsten-manganese alloy, tungsten containing alloy, silicon-manganese alloy, manganese containing alloy or the like.

The spraying head 14 is connected with a second end of the heating tube 12, and has an interior that is tapered. The spraying head 14 is provided with a nozzle 141 which is connected with the pyrolysis and carbonization reaction device 24. The spraying head 14 has a surface provided with a plurality of second holes 142 to enhance the surface area and to provide a temperature (or heat) storage effect.

In practice, the steam generating device 23 is heated by the heater 28 such that the water of the steam generating device 23 is heated to produce a saturated steam which is delivered through the connecting pipe 11 into the heating tube 12 which heats the saturated steam to produce a superheated steam. The superheated steam is dissociated and transferred into water ions by the alloy catalyst layer 13 of the air channel 121. At this time, the alloy catalyst layer 13 performs a dissociation process to the superheated steam ($H_2O$) which is dissociated into hydrogen ion ($H^+$) and hydroxyl ion ($OH^-$). The water ions of the water ion generating device 1 enters the pyrolysis and carbonization reaction device 24 under an atmospheric pressure and an approximately anaerobic state.

Figure 5:
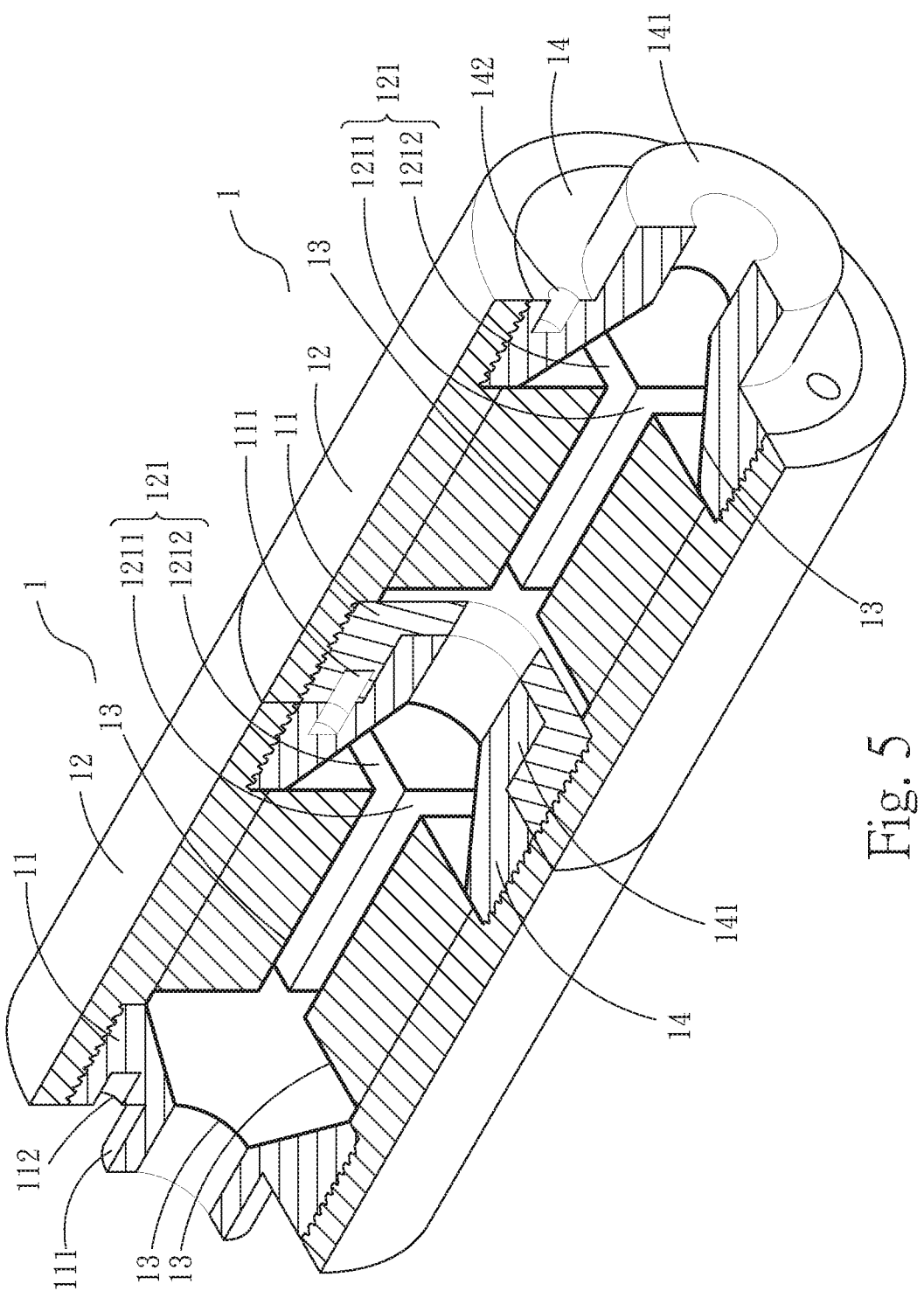
FIG. 5 is a perspective cross-sectional view of a water ion generating device in accordance with another preferred embodiment of the present invention.
Figure 6:
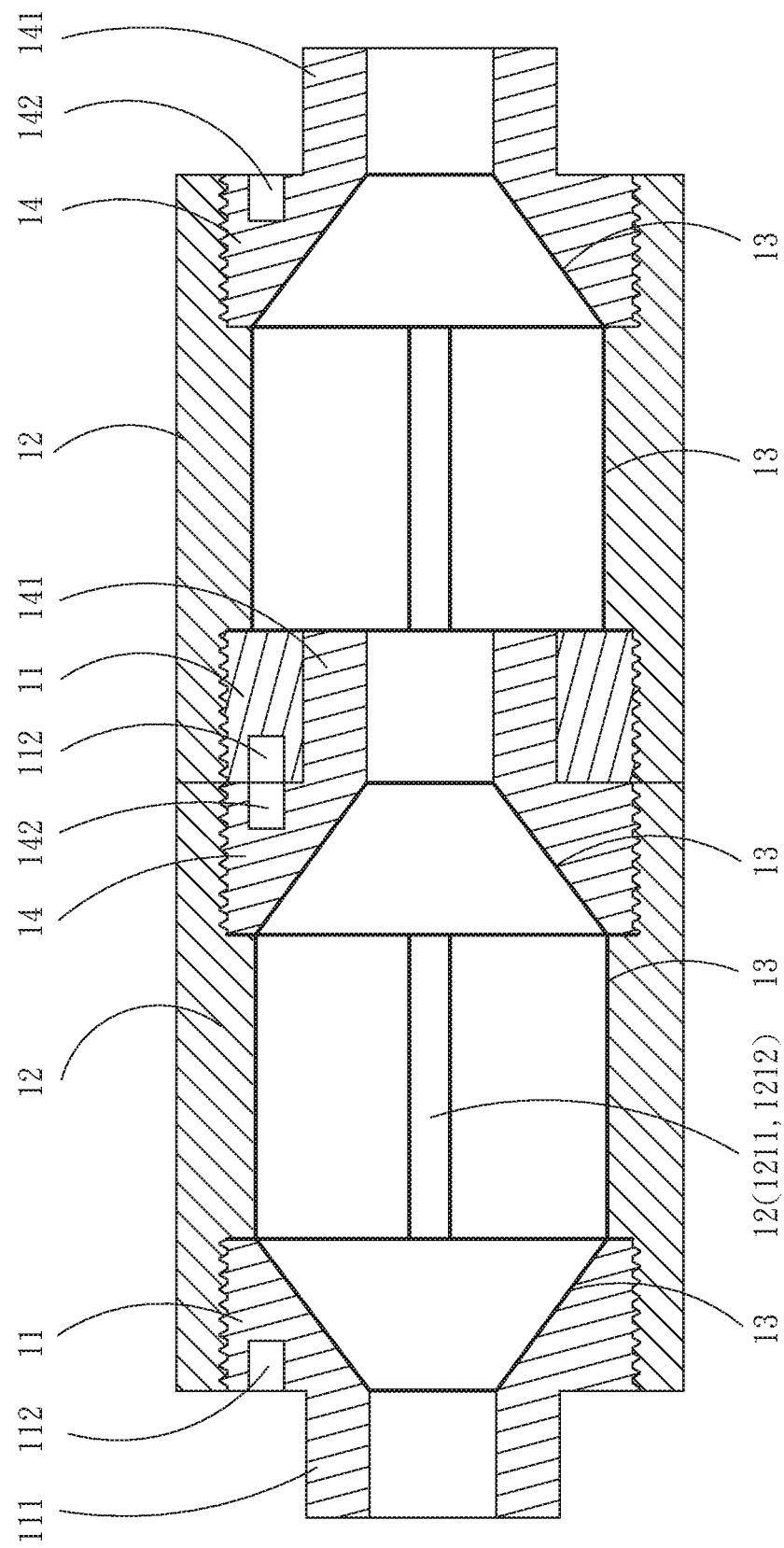
FIG. 6 is a side cross-sectional view of the water ion generating device as shown in FIG. 5.
Figure 7:
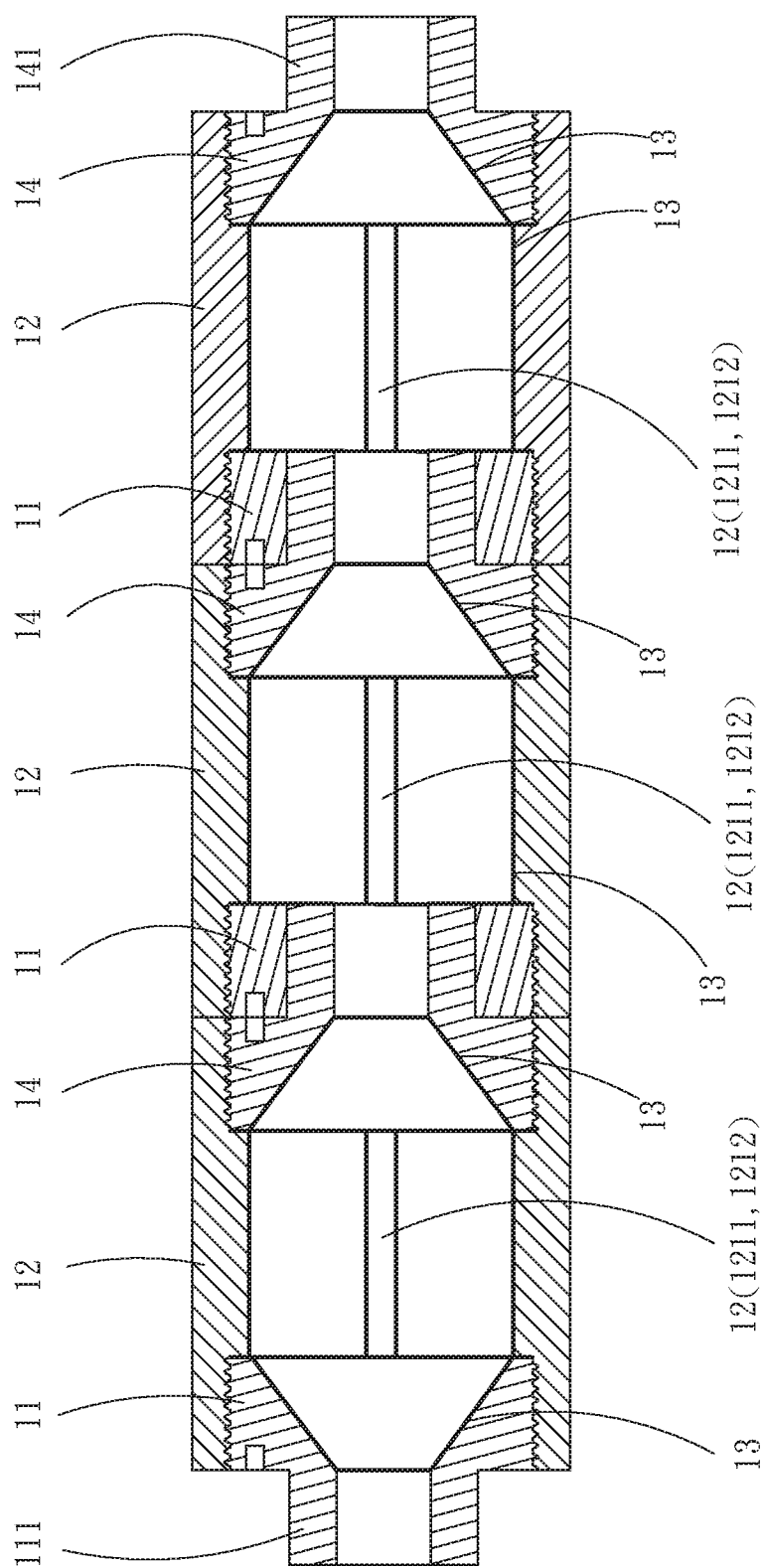
FIG. 7 is a side cross-sectional view of a water ion generating device in accordance with a further preferred embodiment of the present invention.

Referring to FIGS. 5-7, multiple water ion generating devices 1 may be connected serially. For example, when two of the water ion generating devices 1 are connected, the spraying head 14 of one of the water ion generating devices 1 is juxtaposed to and inserted into the connecting pipe 11 of the other one of the water ion generating devices 1. Preferably, the nozzle 141 of the spraying head 14 of one of the water ion generating devices 1 is fitted into the connecting pipe 11 of the other one of the water ion generating devices 1 by interference fit or clearance fit. At this time, the first holes 112 of the connecting pipe 11 and the second holes 142 of the spraying head 14 are adapted for working holes of the interference fit or clearance fit.

The connecting pipe 11 has an interior that is tapered, and a connecting terminal 111 extends outward from the connecting pipe 11. The connecting terminal 111 of the connecting pipe 11 is connected with the steam generating device 23 (see FIG. 1). Thus, the multiple water ion generating devices 1 are connected serially, to enhance the speed of the water ions entering the pyrolysis and carbonization reaction device 24. At the same time, the heating tubes 12 of the multiple water ion generating devices 1 perform a multistage heating process, such that the heating tubes 12 heat the saturated steam into a superheated steam evenly.

Accordingly, the triphase organic matter pyrolysis system 2 and the water ion generating device 1 process triphase (solid, liquid and gas) wastes efficiently under the atmospheric pressure. The water ion generating device 1 produces water ions, and performs anaerobic pyrolysis carbonization reactions on the organic matters, to decompose and dissociate the organic matters step by step, so as to produce a final product, that is, the carbon. The decomposed substances of the organic matters are drained with the steam, and the final product is recycled into a safe inorganic matter, that is, the charcoal, so as to reuse the final product, and to achieve an environmental protection purpose.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A triphase organic matter pyrolysis system, comprising:
   a feeding device delivering organic matters;
   a preheating device connected with the feeding device to receive and preheat the organic matters;
   a steam generating device providing a saturated steam;
   a water ion generating device connected with the steam generating device, and receiving and heating the saturated steam into a superheated steam, wherein the water ion generating device comprises an alloy catalyst layer configured to contact the superheated steam and to dissociate and transfer the superheated steam into water ions;
   a pyrolysis and carbonization reaction device connected with the preheating device and the water ion generating device, to receive the preheated organic matters of the preheating device and the water ions of the water ion generating device, the pyrolysis and carbonization reaction device treating the water ions and the organic matters under an atmospheric pressure and an anaerobic state by reactions of molecular scission, pyrolysis and carbonization, to form carbon residues and gas-liquid wastes;
   a heat recycle device connected with the preheating device and the pyrolysis and carbonization reaction device, to recycle and transmit a heat energy produced during operation of the pyrolysis and carbonization reaction device and a residual heat energy of the gas-liquid wastes to the preheating device;
   a gas-liquid separation device connected with the heat recycle device and the pyrolysis and carbonization reaction device, to receive waste water and waste gases that are separated from the gas-liquid wastes;
   a gas purifying device connected with the gas-liquid separation device, and decomposing the waste gases into a harmless gas which is drained outward;
   an electromagnetic heater connected with the preheating device, the steam generating device, the water ion generating device, and the pyrolysis and carbonization reaction device respectively, to produce a heat energy by electromagnetic heating; and
   a controller connected with the electromagnetic heater, and controlling heating parameters of the preheating device, the steam generating device, the water ion generating device, and the pyrolysis and carbonization reaction device respectively;
   wherein:
   the feeding device delivers the organic matters into the preheating device to perform a preheating process;
   the preheated organic matters of the preheating device are delivered into the pyrolysis and carbonization reaction device;
   water is filled into the steam generating device which heats the water to produce a saturated steam;
   the saturated steam of the steam generating device is delivered into the water ion generating device which heats the saturated steam to produce a superheated steam which is dissociated and transferred into water ions;
   the water ions of the water ion generating device are delivered into the pyrolysis and carbonization reaction device;
   an interior of the pyrolysis and carbonization reaction device is under an atmospheric pressure and is disposed at an anaerobic state;
   the water ions cut, dissociates and carbonizes the organic matters in the pyrolysis and carbonization reaction device to form the carbon residues and the gas-liquid wastes;
   the heat energy is recycled by the heat recycle device and is delivered into the preheating device; and
   the gas-liquid wastes are processed by the gas-liquid separation device and the gas purifying device to form gas and liquid that are harmless.

2. The triphase organic matter pyrolysis system of claim 1, wherein the gas purifying device includes:
   a spray tower connected with the gas-liquid separation device, to receive and process the waste gases by a primary treatment, so as to eliminate acid/alkali, heavy metal, chlorine and carbon; and
   a plasma treatment device connected with the spray tower, to receive and process the waste gases after the primary treatment, the plasma treatment device applying a high voltage to decompose the waste gases, and to produce an electronic flashover which causes combustion, and the waste gases are drained outward when the waste gases are not burned any more.

* * * * *